United States Patent [19]
Cantrell et al.

[11] Patent Number: 6,119,151
[45] Date of Patent: Sep. 12, 2000

[54] SYSTEM AND METHOD FOR EFFICIENT CACHE MANAGEMENT IN A DISTRIBUTED FILE SYSTEM

[75] Inventors: Thomas George Cantrell; Sebnem Jaji; Amal Ahmed Shaheen; Richard Byron Ward, all of Austin, Tex.

[73] Assignee: International Business Machines Corp., Armonk, N.Y.

[21] Appl. No.: 08/206,706

[22] Filed: Mar. 7, 1994

[51] Int. Cl.⁷ .................................................. G06F 15/167
[52] U.S. Cl. .......................................... 709/216; 711/100
[58] Field of Search .................................. 395/500, 200, 395/800, 600; 709/216, 213; 711/100

[56] References Cited

U.S. PATENT DOCUMENTS

| | | | |
|---|---|---|---|
| 4,887,204 | 12/1989 | Johnson et al. | |
| 5,113,519 | 5/1992 | Johnson et al. | 395/600 |
| 5,136,716 | 8/1992 | Harvey et al. | 395/800 |
| 5,151,989 | 9/1992 | Johnson et al. | 395/600 |
| 5,210,824 | 5/1993 | Putz et al. | 395/145 |
| 5,261,051 | 11/1993 | Masden et al. | 395/200 |
| 5,287,507 | 2/1994 | Hamilton et al. | 395/650 |
| 5,305,389 | 4/1994 | Palmer | 382/1 |
| 5,305,440 | 4/1994 | Morgan et al. | 395/200 |
| 5,313,581 | 5/1994 | Giokas et al. | 395/200 |
| 5,313,638 | 5/1994 | Ogle et al. | 395/725 |
| 5,329,619 | 7/1994 | Pagé et al. | 395/200 |
| 5,339,435 | 8/1994 | Lubkin et al. | 395/700 |
| 5,410,697 | 4/1995 | Baird et al. | 395/650 |

OTHER PUBLICATIONS

Log–based Directory Resolution in the Coda File System by Satyanarayanan, 1993 IEEE publication, pp. 202–213.
The Influence of Scale on Distributed File System Design, by Satyanarayanan, IEEE publication 1992, pp. 1–8.
Proceedings of the Usenix Mobile and Location Independent Computing Symposium, Aug. 2–3, 1993, "Disconnected Operation for AFS", Huston et al, pp. 1–10.
Proceedings of the 3rd Workshop on Workstation Operating Systems, Apr. 23, 1992, "On the Ubiquity of Logging in Distributed File Systems", Satyanarayanan et al, pp. 122–125.
*Computer Standards & Interfaces*, 14 (1992), No. 3, Amsterdam, NL, "On the Feasibility of ISO FTAM–based File Servers to Implement a Heterogeneous File System", Marshall et al, pp. 191–208.
*IEEE Transactions on Software Enginering*, 19 (1993) Jun., No. 6, New York, "Accessing Files in an Internet: The Jade File System", Rao et al, pp. 613–624.
*Computer*, IEEE May 1990, "Scalable, Secure, and Highly Available Distributed File Access", M. Satyanarayanan, pp. 9–21.
Summer USENIX Conference Proceedings, Anaheim, Jun. 1990, "Efficient User–Lever File Cache Management on the Sun Vnode Interface", D. C. Steere et al.
Proceedings of the 13th ACM Symposium on Operating Systems Principles, Oct. 1991, "Disconnected Operation in the Coda File System", J. J. Kistler et al.

(List continued on next page.)

*Primary Examiner*—Zarni Maung
*Attorney, Agent, or Firm*—David A. Mims, Jr.

[57] ABSTRACT

A cache manager efficiently supporting both connected and disconnected client operation. A single integrated cache is maintained for file system data, status and pathname information. File system requests are satisfied by the cache if possible and passed to a remote file system for servicing if necessary. The cache manager is independent of operating system file syntax and distributed file system protocol. Disconnected operation is supported through an aggressive caching policy and by logging of file system modifications. Modification logs are created when the client is disconnected by logging objects that optimize the log as it is created. Cache file system objects can have multiple parents each with different naming syntax because the object name is not cached.

12 Claims, 6 Drawing Sheets

OTHER PUBLICATIONS

Mobile and Location–Independent Computing Symposium, USENIX Association, "Disconnected Operation for AFS", L. B. Huston et al, pp. 1–10.

Summer USENIX Conference Proceedings, 1986, "Vnodes: An Architecture for Multiple File System Types in Sun UNIX", S. R. Kleiman, pp. 238–247.

*IEEE Transactions on Computers*, vol. 39, No. 4, Apr. 1990, "Coda: A Highly Available File System for a Distributed Workstation Environment", M. Satyanarayanan et al, pp. 447–459.

SYSTEM AND METHOD FOR EFFICIENT CACHE MANAGEMENT IN A DISTRIBUTED FILE SYSTEM

BACKGROUND OF THE INVENTION

1. Field of the Invention

The present invention relates to information handling systems for managing data. More particularly, the present invention relates to data management in clients in a distributed file system. Still more particularly, the present invention relates to caching and logging in distributed file system clients which may support connected or disconnected client operation.

2. Background and Related Art

Computer workstations have increased in power and storage capacity. Workstations were originally used by a single operator to perform one or more isolated tasks. The increased deployment of workstations to many users in an organization has created a need to communicate between workstations and share data between users. This has led to the development of distributed file system architectures such as that shown in FIG. 1.

A number of workstations in FIG. 1 are interconnected by a local area network (LAN). A wide area network (WAN) may be used to interconnect a number of local LANS. The LANs and WANs form a single logical network. Workstations in FIG. 1 are identified as servers S1, S2, S3 and clients C1, C2, C3. The designation of a workstation as a client or server depends upon the function executed by the specific workstation in the network. A particular workstation may be both a client and a server. Implementation of a distributed file system requires the presence of at least one server and at least one client.

Client workstations have traditionally been connected to the LAN at all times to receive the services of the LAN and to share resources such as files. Disconnection from the LAN meant the workstation was cutoff from the LAN resources. Work could be continued on the detached client only if the necessary files and programs had been copied to the client before disconnection.

The increased power of portable workstations has made detached or "mobile" computing practical. Portable workstations can be purchased with processor, memory and disk storage capacities equal to those of desktop or deskside units. Portable workstations or portable computers, however, currently have the same limitation when detached: no shared resource can be used unless a copy of that file or program was made prior to disconnection. When the workstation is reconnected it is left to the user to manually reconcile the files changed on the portable device with those on the network. FIG. 1 illustrates a disconnectable portable workstation as client C1 102 connected by a dashed line to the network.

The sharing of data files across a network such as that shown in FIG. 1 has evolved over time. The simplest form of sharing allows a client to request data from a file on the server. The necessary data is sent to the client processor and any changes or modifications to the data are returned to the server. Appropriate locks are created so that a second client does not change the data in a file held by the first client.

Distributed file systems enhance file sharing by adding mechanisms to more effectively distribute data to clients and to more effectively control sharing of files. Many distributed file systems exist. One popular distributed file system is the Andrew File System (AFS) distributed by Transarc Corp.

AFS improves distributed file processing efficiency by creating a file cache in a client that is accessing server data. This cache is referenced by client applications and only a cache miss causes data to be fetched from the server. Caching of data reduces network traffic and speeds response time at the client.

AFS cache consistency is based on a server callback system. The server will notify each client that has certain data cached of any condition that renders the client's cached data invalid. Once invalid, the data is purged from the cache and must be reacquired from the server when it is needed. Disconnection of a workstation connected to AFS will cause loss of distributed file access by the client. The client will automatically drop all callbacks when disconnected causing the cache to be invalidated.

The Distributed File System (DFS) is a follow-on to AFS that supports the OSF Distributed Computing Environment (DCE). DFS uses a server-based token mechanism to ensure client cache consistency. Clients acquire "read" tokens to ensure the data in their cache is valid. If a client is to change data in a file, it acquires a "write" token for the data. Granting a "write" token to one client, e.g. C1, invalidates "read" tokens for the same data in all other clients. The token invalidation renders the cached data in these clients invalid. Disconnection from a DFS system will cause the client to lose any outstanding tokens. The client will be unable to read or write even to cached data due to the lack of tokens.

Carnegie Mellon University has undertaken an effort to provide support for detachable workstations connected to an AFS network. The CODA project is directed at providing a distributed file system with constant data availability. It accomplishes this by replicating data in multiple servers and providing support for disconnected operations by clients. See "Coda: A highly Available File System for a Distributed Workstation Environment," IEEE Transactions, Vol. 39, No. 4, April 1990.

Distributed operation in Coda is accomplished by optimistic replica control of data. Optimistic control allows many clients to read and write data, even if disconnected. Data inconsistencies are left to be identified and resolved later. Pessimistic replica control avoids all conflicts by restricting reads and writes to a single partition. Disconnection removes from the client the ability to determine whether another client has access to data. Under pessimistic replica control, the client would be unable to write. See "Disconnected Operation in the Coda File System," J. Kistler, M Satyanarayanan, Carnegie Mellon University, Proceedings of the 13th ACM Symposium on Operating Systems Principles, October 1991.

Coda distributed operation allows the client to continue to access and update data held in the client side cache. File operations fail only when a cache miss occurs since the only then is the client unable to access the data from the server. AFS and Coda cache entire files. Coda updates the file during disconnected operations and maintains a log of all changes to the data. Upon reconnection the client is responsible for updating all server replicas of the data by applying the logged transactions to the server files. Data inconsistencies are handled by deferring resolution for manual intervention.

Coda has a major disadvantage that only connection to a Coda server is supported. Coda, like AFS, is a distributed file system protocol. Coda relies on the fact that the server or servers and all clients are using the same distributed file system protocol. The requires that all clients and servers in the network be changed to the Coda protocol to support disconnected operation.

A second approach has been suggested by Huston and Honeyman in "Disconnected Operation for AFS," L. B. Huston and P. Honeyman, Center for Information Technology Integration, The University of Michigan, published in the Proceedings of the USENIX Mobile and Location-Independent Computing Symposium, August, 1993. Huston and Honeyman propose a client system that can connect to a standard AFS server without modification to the server. Client code modifications support disconnected operation and reconnection. Reconnection and reconciliation is accomplished by logging every transaction while disconnected. Every read, write or update is recorded in a transaction log that is replayed to the server upon reconnection. This approach has the advantage of supporting a standard AFS server. It depends, however, on the presence of the AFS distributed file system protocol and does not operate with servers other than an AFS server. The total logging approach also detracts from the system efficiency. The size of the log would create client disk space problems and reconciliation delays in systems of any size.

Thus, a technical problem exists to provide a distributed file system that allows continued operation by disconnected clients with efficient reconciliation upon reconnection. A further technical problem is the creation of a distributed file system client that is usable with numerous distributed file system protocols. Finally, a technical problem exists of creating a distributed file system client that is independent of operating system syntax for object or pathname resolution.

SUMMARY OF THE INVENTION

The present invention is directed to providing a distributed file system that supports both connected and disconnected client operations. The client file system is connectable to multiple file system architectures and supports efficient transaction logging.

The present invention is directed to a method of managing a file system cache in a client computer system operating under a first operating system. The method comprises the steps of: intercepting operating system requests for a file system object in a distributed file system; transforming said requests to remove operating system dependent syntax; testing a cache in a storage means of said client for the presence of data about said file system object; and satisfying said file system object request, if cache data exists.

It is therefore an object of the present invention to provide a distributed file system client that can operate when disconnected from the server.

It is a further object to provide a disconnectable client that efficiently logs transactions for reconciliation upon reconnection.

It is yet another object of the invention to provide a file system client with efficient caching to reduce the amount of memory and disk space required for caching and to increase the speed and efficiency of cache processing.

It is yet another object to provide a distributed file system client operable with multiple distributed file system protocols.

It is yet another object of the invention to provide a distributed file system client that is operating system independent.

It is still another object of the invention to increase cache efficiency through aggressively caching resolved object names.

It is yet another object of the present invention to provide a cache management system that is not dependent upon an object name allowing each file system object to have multiple parents each having different object name syntax rules.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

Figure 1:
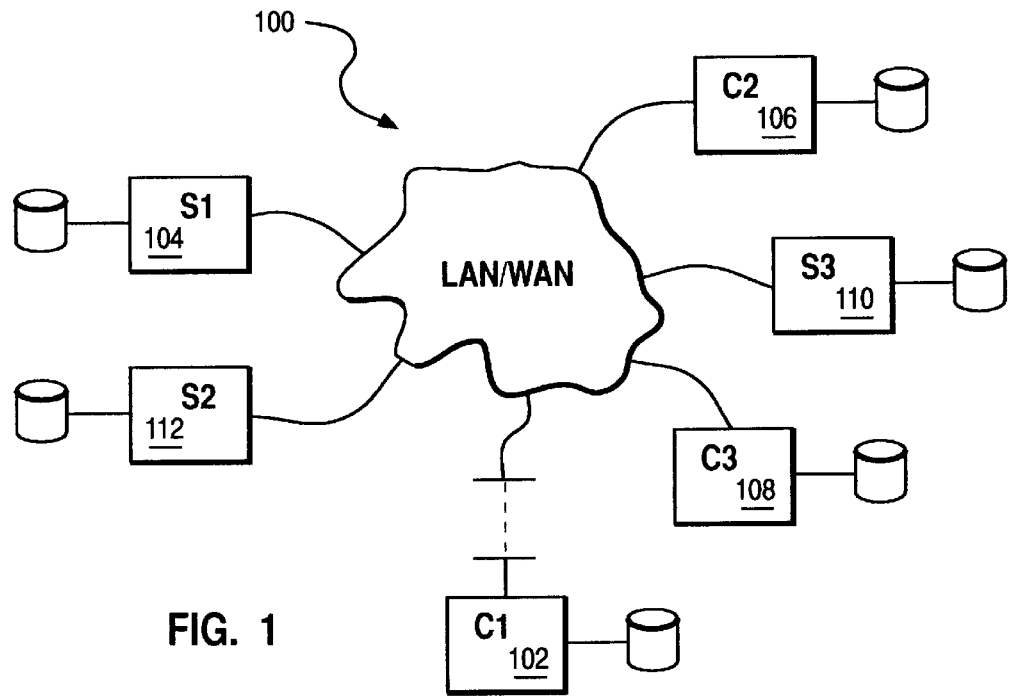
FIG. 1 is an illustration of a distributed network environment in which the present invention is practiced.
Figure 2:
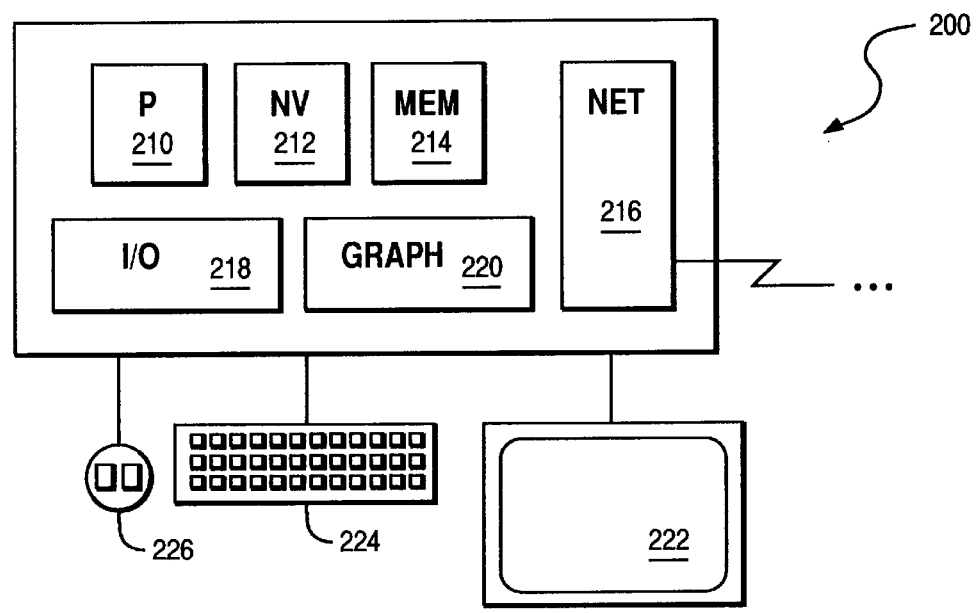
FIG. 2 is a block diagram of a workstation incorporating one embodiment of the present invention.

FIG. 2 illustrates a typical client or server workstation configuration. The present invention is preferably practiced with a workstation such as the IBM RISC System/6000 workstation or the IBM PS/2 personal computer. The client and server workstations are interconnected by a token ring or Ethernet LAN as shown in FIG. 1. Workstations connected to the LAN may include portable workstations such as C1, which may be disconnected from the LAN and used independent of the LAN. it will be realized that many other configurations of workstation hardware or LAN types can be used within the scope of this invention.

A typical client or server workstation 200 has a processor 210, system memory 214 and non-volatile storage 212 such as a hard disk drive, a diskette or optical storage device. The processor accepts input from input/output (I/O) devices such as a keyboard 224 and pointing device 226 through I/O controller 218. The system presents graphic information to the operator on display 222 driven by graphics controller 220. The workstation is connected to a network (not shown) through network interface adapter 216.

The preferred embodiment of the present invention is implemented by a computer process operating in the memory and processor of workstation 200. A computer program product embodying the invention may be stored in non-volatile storage 212 including storage on a tape, diskette, or a compact disk read-only memory (CD-ROM) device.

Figure 3:
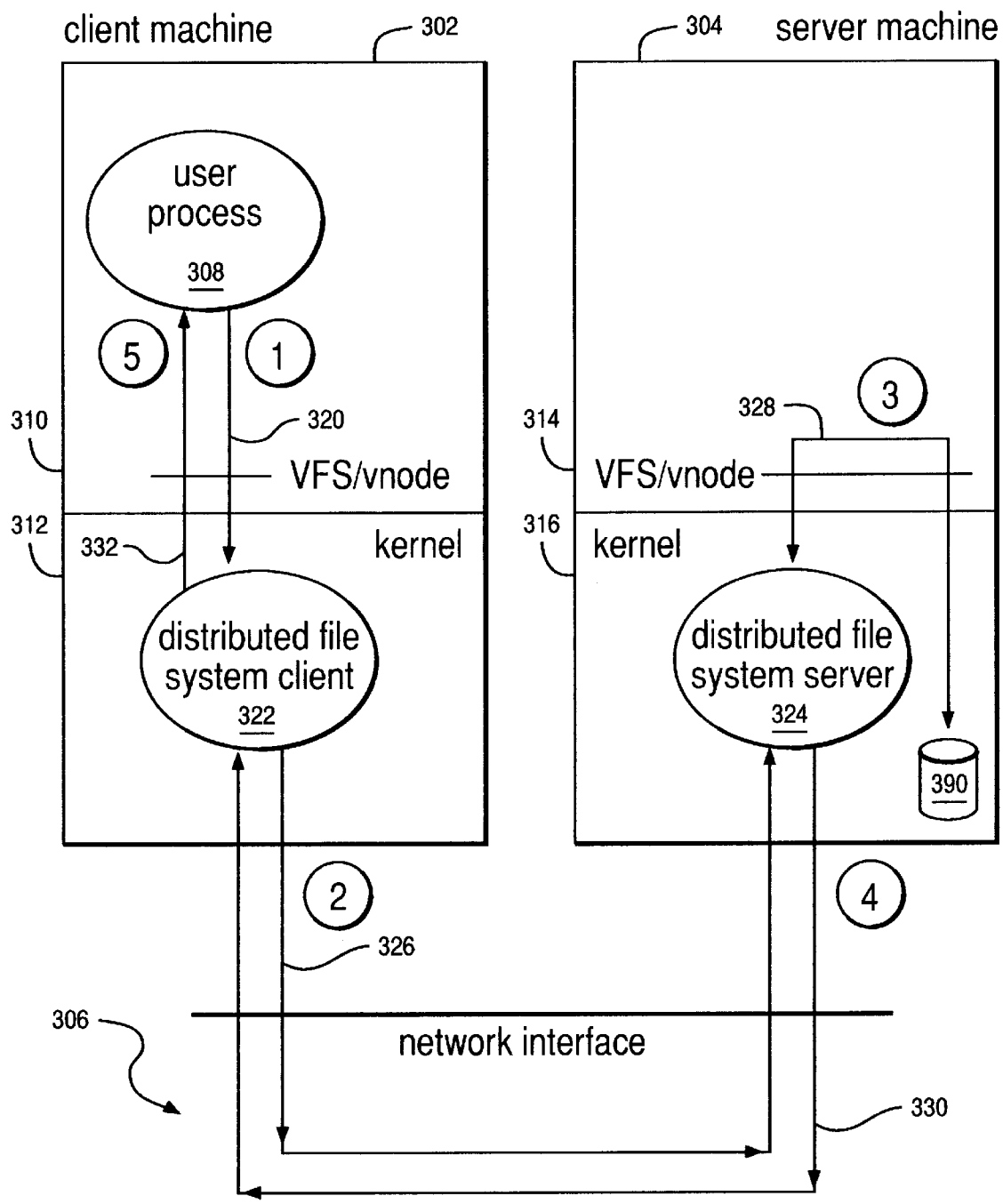
FIG. 3 is a block diagram of a prior art distributed file system.

The operation of prior art distributed file systems is illustrated with reference to FIG. 3. FIG. 3 illustrates a client workstation 302 and a server workstation 304 interconnected by a network interface 306. A request by a user process 308 for a particular file or for information about a file residing on disk storage 390 is processed as follows. Note that both the client 302 and server 304 have been divided into user address space 310, 314 and kernel address space 312, 316. The interface between the application and the kernel (known as an application program interface or API) is the VFS/vnode API defined in S. R. Kleiman, "Vnodes: An Architecture for Multiple File System Types in Sun UNIX®", Summer Usenix Conference Proceedings, 1986. Other interfaces, of course, could be employed. The VFS/vnode interface allows multiple virtual file systems to exist. The distributed file system becomes a virtual file system to the client workstation.

User process 308 requests a data file on storage device 390. The request 320 is intercepted by the VFS interface and passed to the distributed file system client 322 resident in the client kernel address space 312. The distributed file system client manages communication with the server over the network. The request is passed in a message 326 to the distributed file system server 324 in the server kernel 316 over the network 306. Distributed file system server 324 accesses storage device 390 by using the VFS interface 328 to access the server's local physical file system that contains device 390. The requested data is acquired and passed 330 from distributed file system server 324 to distributed file system client 322 which in turn passes 332 the data to the requesting user process 308.

The distributed file system client 322 may include a data cache (not shown) to cache data requested from the server. The distributed file system client will check the cache for valid data before requesting that data from the server.

Figure 4:
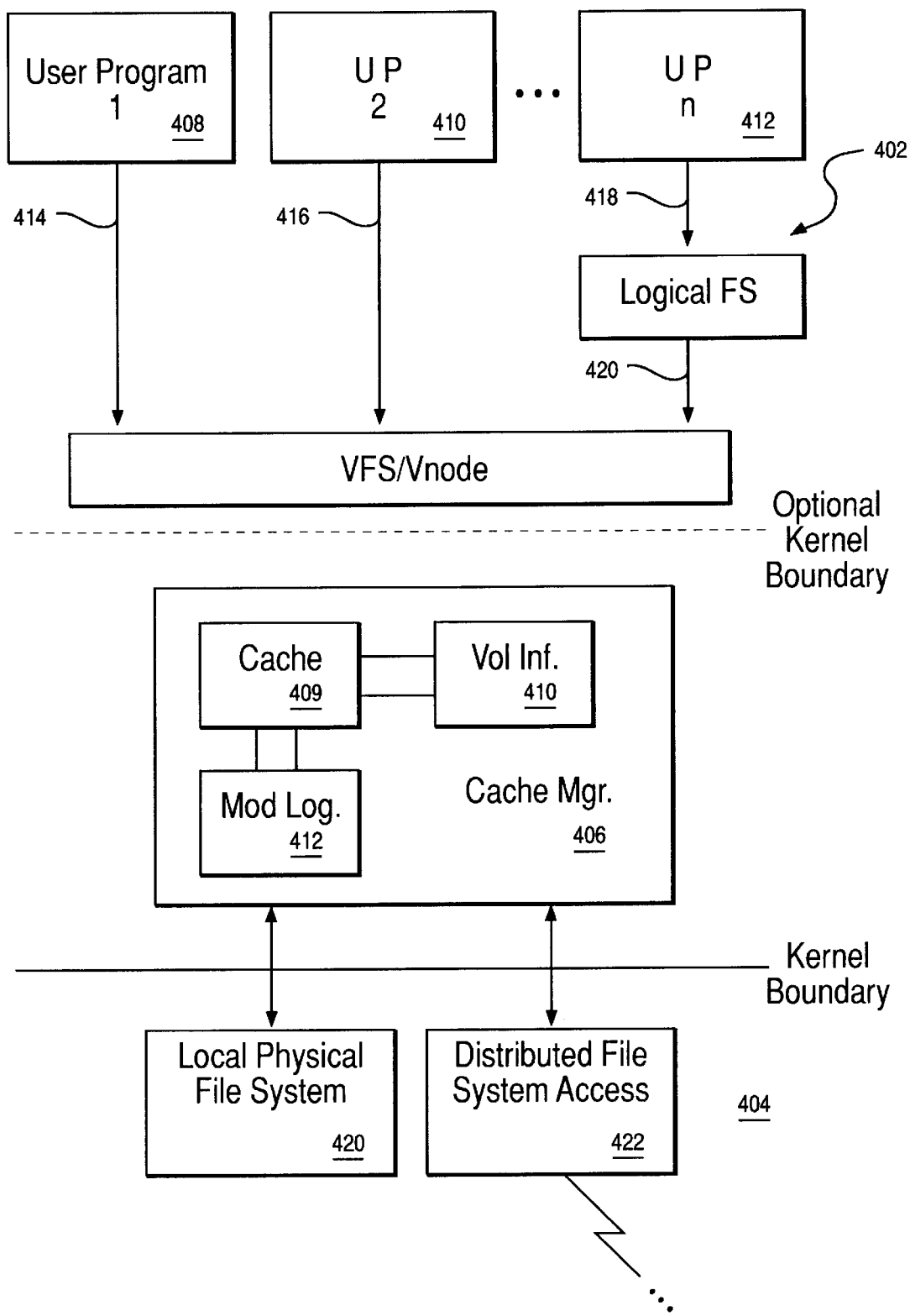
FIG. 4 is a block diagram illustrating the functional components of an embodiment of the present invention.

The preferred embodiment of the present invention is illustrated in FIG. 4. The client workstation has a user address space 402 and a kernel address space 404. The improved cache manager 406 of the present invention operates preferably in the user address space 402 but can be implemented in the kernel address space 404.

User programs 408, 411, 413 issue file system requests 414, 416, 418. User program n is shown as using a logical file system 430 that in turns issues a file system request 440. The file system requests conform to the VFS/vnodes interface, though other interfaces could be used within the scope of the invention. The present invention can be used with any logical file system that conforms to the VFS/vnode API or, in alternate embodiments, conforms to any other API.

The VFS interface directs the file system request to cache manager 406. Cache manager 406 maintains the local information about the distributed file systems accessed by the client. If possible, file system requests are serviced by the cache manager without access to the server. File system requests can be satisfied by the cache manager if the requested information is in the cache and still valid. Cache manager 406 will be described in greater detail below.

File system requests are satisfied by cache manager 406 either from data resident in cache manager memory or by accessing the local physical file system 420 or by using distributed file system access 422. The cache manager keeps local copies of distributed files in the local physical file system for quick access. The distributed file system access 422 issues the necessary commands to the distributed file system server 324 as discussed above. The preferred embodiment caches entire files though the invention is not limited to full file caching.

The cache manager 406 and distributed file system access 422 are independent of the operating system and the distributed file system access protocol. Operating system independence is achieved by supporting defined interfaces. The supported interfaces include: the VFS+/Vnodes interface for file system operations; a persistence interface such as that provided by the IBM SOMobjects persistence framework; local file system interface (LSI) for cached files; various distributed file system protocols; a cache synchronization interface; and a log replay interface. The cache manager does not depend on any operating system syntax. File names are transformed to be independent of file name component separator characters, and are considered to have no reserved characters and no reserved words. Path name resolution is also independent of operating system syntax. Thus, a particular file system object can be referenced by two operating systems with conflicting syntax rules. For example, cache manager 406 may be implemented to operate with the IBM OS/2® operating system or the IBM AIX® operating system or with any other operating system.

The cache manager of the present invention is independent of the distribute file system protocol. Distributed file system access 422 can access remote servers using either the Distributed Computing Environment (DCE®) server from the Open Software Foundation (OSF®) or the IBM LAN Server program product. Other remote file access protocols can be used. The synchronization mechanism and log replay mechanism handle protocol dependent tasks.

Cache manager 406 maintains the client cache 409. In connection with the cache 409, cache manager 406 maintains volume information 410 and a modification log 412. Volume information 410 contains information about the file systems accessible to the client workstation through the cache manager. In the preferred embodiment, remote file systems are connected to the client by volume. Each volume will have a volume entry in the volume information database. Thus, a remote file system will be connected to the client workstation either as a Unix-type file system (e.g. mounted as a particular file system/rfs), or as a DCE drive letter (e.g. as drive G:\.) All information about the remote file system and it's status is maintained in volume information database 410. Multiple remote file systems can be concurrently connected to a single client.

Figure 5:
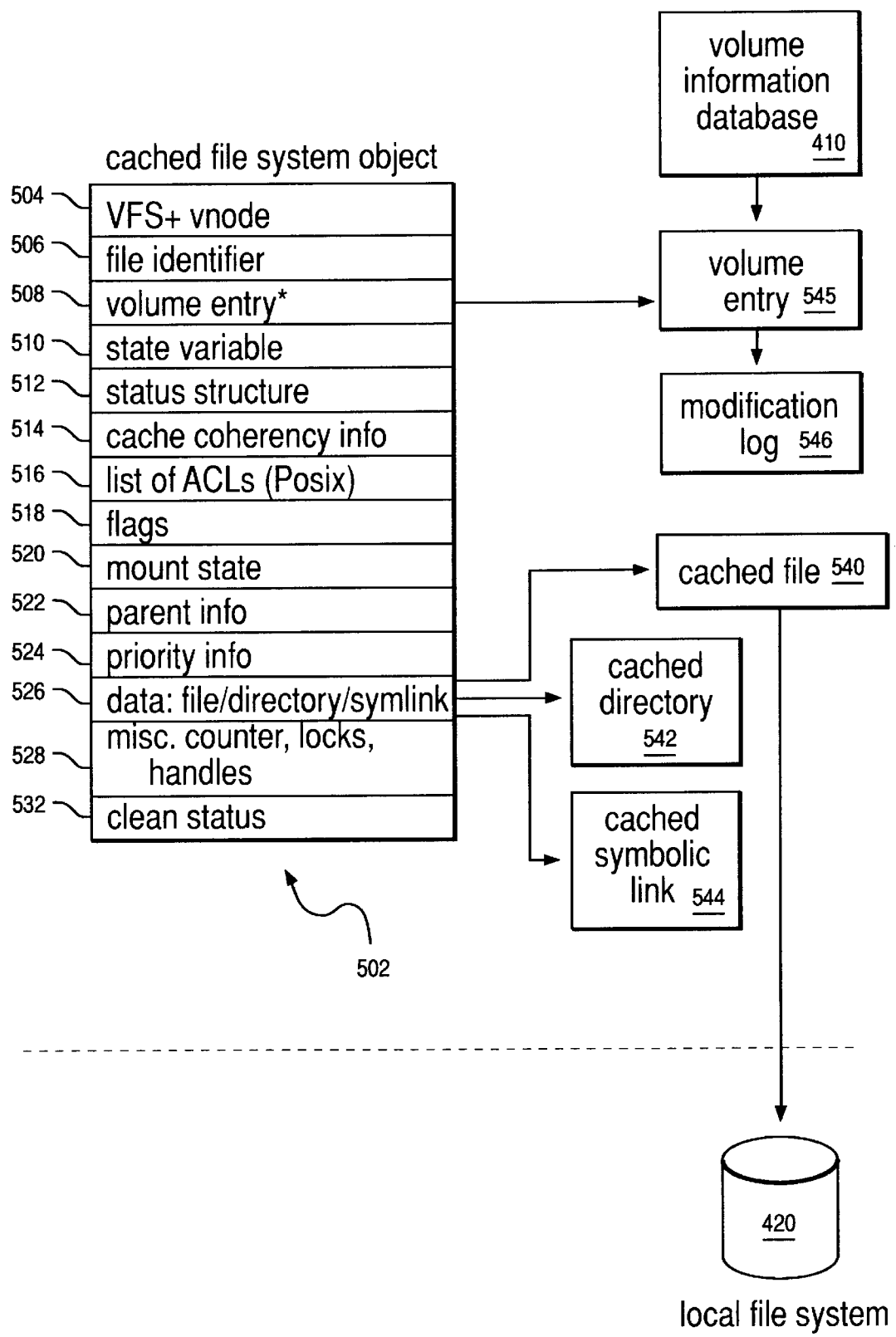
FIG. 5 is an illustration of the data structures in the preferred embodiment of the present invention.

The structure of cache 409 is shown in greater detail in FIG. 5. Cache 409 maintains a single cache for file pathname, file system object data, and file system object status information. The cache is maintained in the persistent heap, i.e. it is periodically written to non-volatile storage from which it can be restored in case of power or system failure. A single integrated cache reduces overall cache memory requirements thereby increasing cache performance. The single cache requires only one hash table instead of the three found in prior art systems. All cache processing can be implemented in a single set of code that stores different types of file system objects rather than the traditional mechanism of separate code for each type of cache. The cached file system object is shown generally at 502. The file system object 502 is used for both connected and disconnected operation of the cache manager.

File system object 502 is a data structure containing the information necessary to access a remote file or the local cached copy of the remote file. A file system object entry is created in the cache for each remote file or directory referenced by the client workstation. The file system object contains a FS+/vnode identifier 504 and file identifier 506. File identifier 506 includes volume, server, and file data. The VFS+/vnode identifier contains the information defined by the VFS/Vnodes standard specification. Inclusion of that information allows full support for all VFS/Vnode interfaces. The present invention appends additional information to the data structure to support enhanced caching and disconnected operation. The volume entry 508 is a pointer to a volume entry 545 in the volume information database 410 for the volume to which the file belongs. A state variable 510 and state structure 512 is maintained to provide cache status information for the data. In the preferred embodiment, implemented in an object oriented environment using tools such as the C++ programming language, the status structure is defined as an object class. The status structure for a particular operating system file (e.g. OS/2 or AIX) is defined by creating a subclass of the status structure class. The subclass will override the status structure class with the exact contents necessary to define file status.

The file system object maintains cache coherency information 514. This information is used to ensure consistency between the cache and the server and server replicas. A list of access control lists (ACLs) 516 define permissions for file system access and modification according to the IEEE POSIX® standard. Other flag information is maintained at 518. The mount state of the volume is maintained 520 as is parent pointer 522 and priority information 524. Each file system object has an assigned priority that is used when determining which objects to purge to make room for new objects.

File system data is accessed through a file/directory/symlink pointer 526. This pointer provides access to three different types of cache data depending on the file system object type. A file system object for a data file will have a pointer to the cached file 540 which in turn points to the copy of the local cached data file in the local file system 420. A directory pointer points to a cached directory 542. The cached directory 542 is built based on an aggressive caching scheme. Whenever directory information is requested for a particular directory, that directory and all of its immediate children are returned. This reduces cache misses because of the high probability that information about one or more children will be requested soon after the parent directory information. The directory cache provides information necessary for pathname resolution, i.e. mapping a particular file system path request to a particular data file. Finally, pointer 526 may point to cached symbolic link information 544. This cached information allows resolution of symbolic links.

Entries are provided for miscellaneous counters, locks and handles at 528, and an indicator of the clean status 532. The clean status indicator 532 is important for disconnected operation and is used to indicate reconciliation status.

It is important to note that the name of the file system object is not included in the data structure 502. This allows the file system object to be referenced from different object names sets without conflict. Each file system object can have multiple parents. Each parent may conform to a different naming convention, e.g. the naming specification of the Object Management Group (OMG), or that of AIX, OS/2 or other operating system. Thus, a particular file object employee_list may be accessible from OS/2 as c:\employee_list and from AIX as /usr/employee_list.

Cache manager 406 supports both connected and disconnected operation. During connected operation cache manager 406 satisfies file system requests from the cache or, if necessary, though remote file access. When disconnected, cache manager satisfies requests from the cache and maintains a modification log 412 of all file system modifications.

Figure 6:
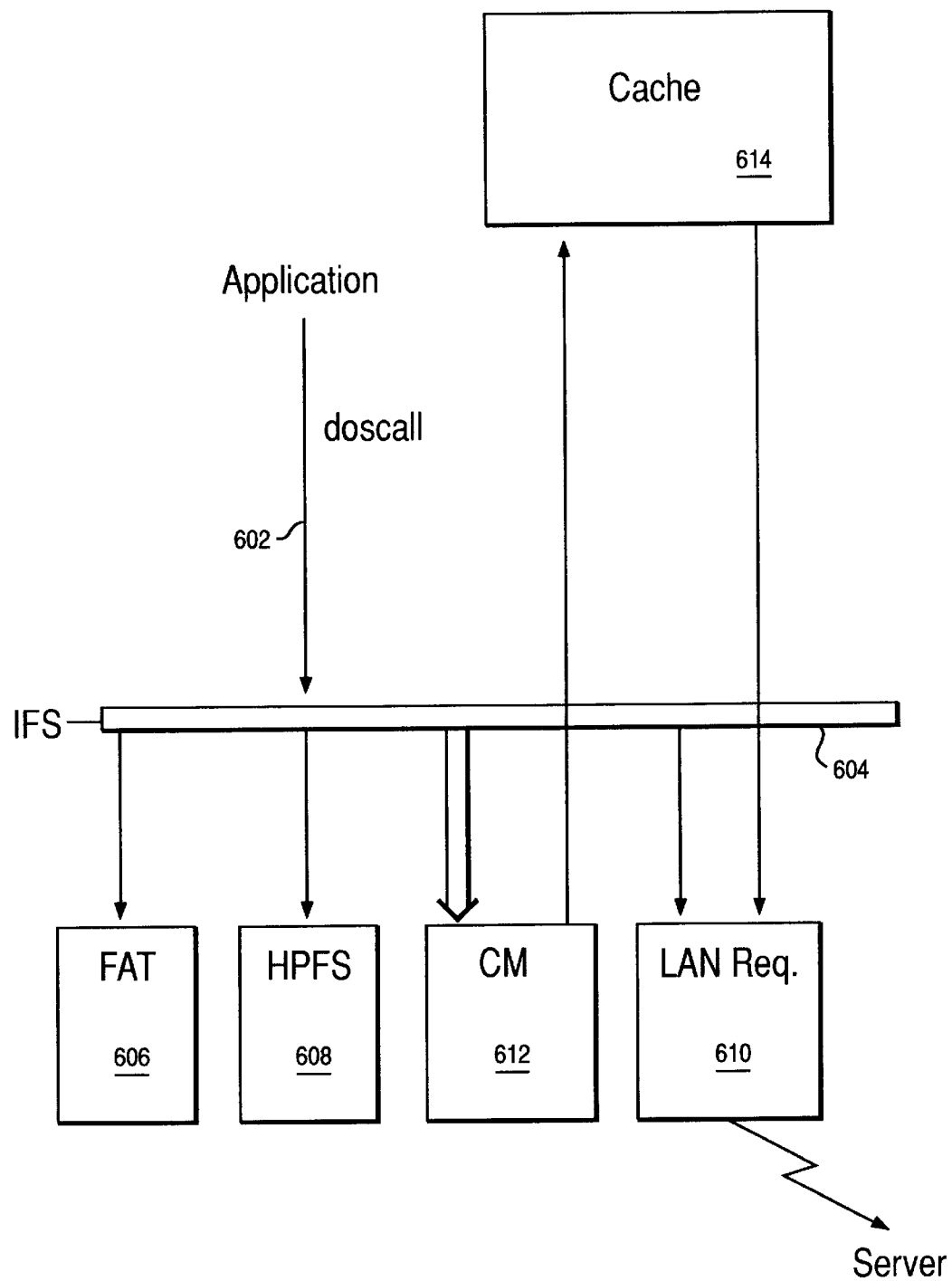
FIG. 6 is a block diagram of an alternate embodiment of the present invention.

One implementation of the cache manager according to the present invention is shown in FIG. 6. This embodiment is designed for use with the IBM OS/2 operating system. File system requests are issued by the system as a "doscall" command 602. All file system requests are served by the IFS file system 604. IFS provides logical file system capabilities. Different types of file systems may be mounted and served by IFS. Mounted file systems may include for example, the FAT file system 606 common to DOS systems, or the OS/2 HPFS file system 608. In a LAN environment, the LAN Requester 610 appears as another file system in which file accesses are passed to the LAN Server for action. A cache manager according to the present invention can be mounted as another type of file system 612. All remote file system accesses are passed to the cache manager 612. The cache manager tests the cache 614 (in user address space) to determine whether the requested information has been cached. If so, the information is provided to the application, including, if necessary, providing or modifying cached data retained in the local file system 606 or 608. If the file system data is not found, a request is passed to the LAN requester 610 causing it to access the necessary data on the LAN server. When the remote data arrives, it is placed in the cache for future reference.

Figure 7:
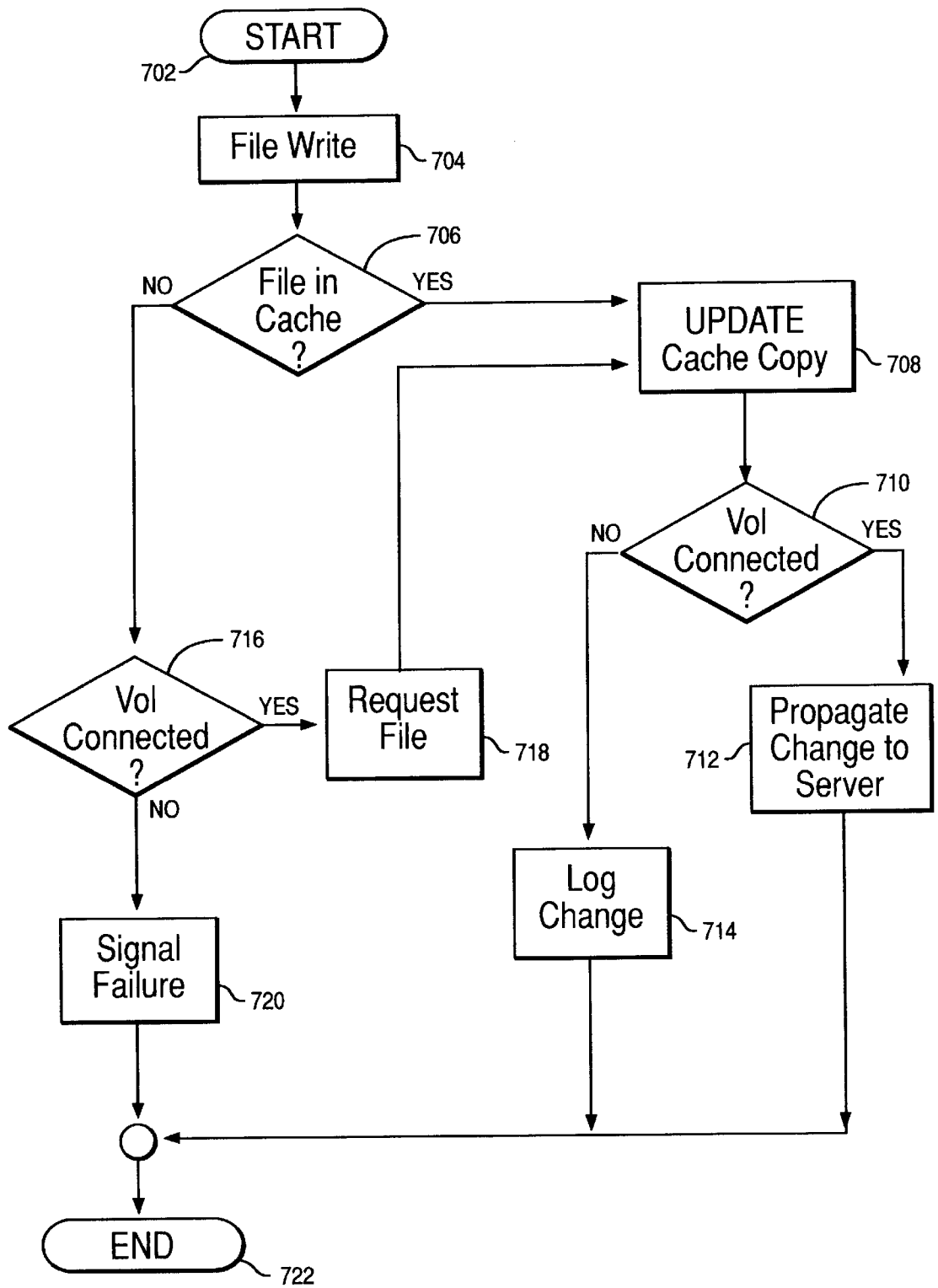
FIG. 7 is a flowchart depicting the process steps of one embodiment of the present invention.

A flowchart illustrating the process flow for a file write command is shown in FIG. 7. Other file system commands are implemented similarly. The command starts at 702 with the issuance of a file write command 704. The cache manager tests to determine whether the requested file is in the cache 706. If so, the cache copy of the file is updated 708. Next, the cache is tested to determine whether the volume is currently connected 710. Connection status is maintained in the volume information database 410. If the volume is connected, the change is propagated back to the server 712 and processing terminates 722. If the volume is not connected, the change is logged 714 in the modification log and processing terminated 722.

If the requested file is not in the cache, the cache manager next tests whether or not the requested volume is connected 716. If connected, the file is requested from the remote file system 718, placed in the cache and processing resumed at step 708. If the volume is not connected, a failure signal is returned to the application 720.

Logging of modifications (e.g. step 714) into modification log 546 is accomplished by logging objects. The problem domain is represented by a client modify log class and a separate class for each different type of transaction logged. A different object is defined for each type of operation, e.g. one would exist for write file, create file, remove file. When the cache manager logs a change 714 in disconnected operation mode a log object type corresponding to the requested operation is created (e.g. write file.) A log method is invoked to put the object in the log. The object methods include methods to compress and optimize the log for replay. Logging a particular object may cause removal of a previously logged object. For example, when a file is created and then later removed, the file removal object will remove the file creation log entry, any file modification log entries, and then exit without placing a file removal entry in the log. This system assures that the synchronization of the cache with the remote file system on reconnection will occur rapidly and efficiently. The intelligence in the logging objects eliminates the need to process or compress the log prior to replay.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method of managing a file system cache in a client computer system operating under a first operating system, the method comprising the steps of:

intercepting operating system requests for a file system object in a distributed file system;

transforming said requests to remove operating system dependent syntax;

testing a cache in a storage means of said client for the presence of file system object data based on said transformed request;

satisfying said transformed request for said file system object data, if cache data exists;

testing to determine whether a connection exists to said distributed file system;

generating a request for said file system object from said distributed file system, without regard to distributed file system protocol, if no cache data exists and there is a connection;

transmitting said request to said distributed file system; and rejecting said file system object request, if no cache data exists and there is no connection.

2. The method of claim 1 wherein the step of transmitting said request comprises the steps of:

determining a distributed file system protocol for said requested file system object;

transforming said operating system independent request into a request complying with said determined distributed file system protocol; and sending said transformed operating system independent request to said distributed file system.

3. The method of claim 1 further comprising the steps of:

performing the following steps whenever said testing step determines that no connection exists between said client computer system and said distributed file system:

testing said file system object to determine a request type;

activating a request logging object for said request type;

invoking a modify log method to log said file system object request; and logging said file system object request by performing log optimization processing for said request type.

4. A computer file system comprising:

cache means for storing file system object data in a storage means;

cache management means for satisfying operating system requests for file system objects using said cache means, said cache management means being independent of operating system syntax and independent of distributed file system protocol, said cache management means implemented within a client computer system, said cache management means further comprising:

means for intercepting an operating system request, from said first operating system, for a file system object stored in a remote server computer system operating under a second operating system in said distributed file system;

means for transforming said request to remove operating system dependent syntax;

means for testing a cache in a storage means of said client computer system for the presence of file system object data based on said transformed request;

means for satisfying said file system object request from said cache, if said file system object data based on said transformed request is present in said cache;

network means detachably connecting said cache management means to a file system object server; and remote file access means for accessing file system object requests through said network means.

5. The system of claim 4, further comprising:

object modification logging means for maintaining a log of file system modifications for each operating system request processed by said cache management means whenever said cache means is disconnected from said file system object server.

6. A computer system cache apparatus for maintaining file system information, comprising:

storage means for storing a plurality of file system object data entries;

link means for linking each of said plurality of file system object data entries to a file volume; and second link means for linking each of said plurality of file system object data entries to either a location in local data storage, a directory cache in local memory, or a symbolic link in local memory, wherein said plurality of file system object data entries are independent of any file system object name and are referencable by multiple file system object parents each having different naming syntax.

7. The computer system of claim 6, further comprising:

logging means for logging for each file volume all changes made to objects referenced by said plurality of file system object data entries when said cache is disconnected from said file volume.

8. The computer system of claim 6, further comprising:

interface means for accepting operating system requests for one or more file system object data entries and transforming the requests into operating system independent requests.

9. The computer system of claim 8, wherein said directory cache comprises:

means for storing resolved directory entries for requested file system data objects; and means for storing resolved directory entries for objects hierarchically immediately below each path component of said requested file system data objects.

10. The computer system of claim 6, further comprising:

logging means for logging for each file volume all changes made to objects referenced by said plurality of file system object data entries when said cache is disconnected from said file volume.

11. The computer system of claim 6, further comprising:

interface means for accepting operating system requests for one or more file system object entries data and transforming the requests into operating system independent requests.

12. The computer system of claim 11, wherein said directory cache comprises:

means for storing resolved directory entries for requested file system data objects; and means for storing resolved directory entries for objects hierarchically immediately below each path component of said requested file system data objects.

* * * * *